J. ELY.
TUBE FOR CONDENSERS OR OTHER THERMAL INTERCHANGERS AND PROCESS OF PRODUCING THE SAME.
APPLICATION FILED APR. 14, 1909.
997,281. Patented July 11, 1911.
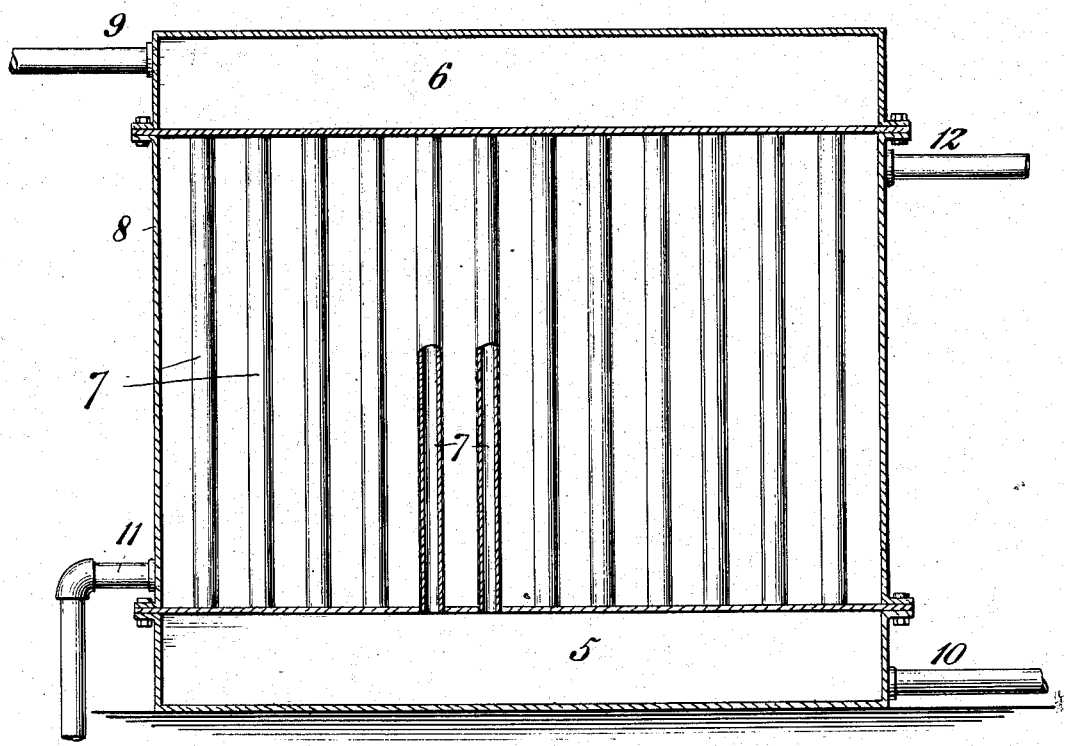
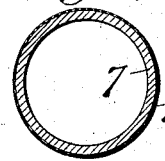
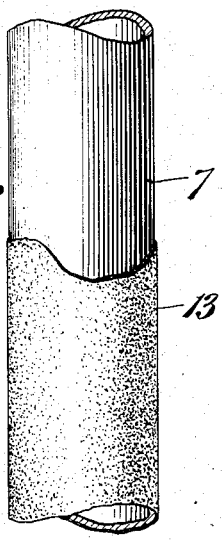
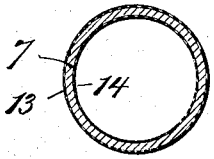
WITNESSES:
J. C. Hartmann
V. Sandreuos Jr.
INVENTOR
James Ely
BY
Chapin Hayward
his ATTORNEYS

UNITED STATES PATENT OFFICE.

JAMES ELY, OF SUMMIT, NEW JERSEY, ASSIGNOR OF ONE-HALF TO JOHN B. ROACHE, OF BROOKLYN, NEW YORK.

TUBE FOR CONDENSERS OR OTHER THERMAL INTERCHANGERS AND PROCESS OF PRODUCING THE SAME.

997,281.        Specification of Letters Patent.       Patented July 11, 1911.

Application filed April 14, 1909. Serial No. 489,809.

*To all whom it may concern:*

Be it known that I, JAMES ELY, a citizen of the United States of America, and a resident of Summit, county of Union, and State of New Jersey, have invented certain new and useful Improvements in Tubes for Condensers or other Thermal Interchangers and Processes of Producing the Same, of which the following is a specification, reference being had to the accompanying drawings, forming a part thereof.

In condensers or other apparatus whose function is the interchange of thermal units between fluids separated therein by tubular walls, the said tubular walls are apt to become quickly destroyed owing to the corrosive action of the fluids in contact therewith, and also to electrolytic action which is often present. In condensers employed on board ship where sea water is used as the cooling medium the tubes thereof deteriorate very rapidly due to the foregoing actions, and in addition thereto, an incrustation is rapidly formed such as seriously interferes with the conduction of heat and hence with the required interchange of thermal units.

The object of my present invention is to protect the tubular walls in such apparatus from the electrolytic and corrosive actions, and to prevent such incrustation, while at the same time interfering as little as possible with the conduction of heat so as to maintain the efficiency of the apparatus as a thermal interchanger. To these ends I apply a thin coating of rubber to the tubes either inside or outside, or both, as may be found necessary or preferable, this thin coating of rubber being applied preferably by dipping the tubes into a solution of rubber or rubber compound and in then vulcanizing the protective coating thus applied. By making this coating very thin the conduction of heat is interfered with but very little and the efficiency of the apparatus is not materially reduced. The rubber coating, however, insulates the metal of which the tubes are composed from electrolytic action and from corrosive chemical action generally, and I have also found as a result of actual experiment that such coating prevents incrustation to a very high degree; for instance,—in condensers using salt water as the cooling medium, I have found that there is practically no deposit of salt upon the rubber coated tubes such as rapidly forms where the tubes are not so coated.

I will now proceed to describe an embodiment of my invention, having reference to the accompanying drawings illustrating the same, and will then point out the novel features in claims.

In the drawings: Figure 1 is a view in central vertical section of a condenser employing tubes constructed in accordance with my invention. Fig. 2 is an enlarged view in detail of a portion of one of the said tubes. Fig. 3 is a view in transverse section therethrough. Fig. 4 is a transverse sectional view of a tube coated both upon the inside and upon the outside.

To illustrate my invention I have shown a conventional form of condenser, as the general form or construction thereof forms no part of the present invention, and indeed it will be understood that my invention is applicable to tubes of other forms of thermal interchangers besides condensers. The condenser shown comprises a lower header 5, an upper header 6, a plurality of tubes 7 which connect the chambers inclosed by the headers 5 and 6, and a casing 8 which surrounds the tubes 7. Steam to be condensed is admitted through an inlet pipe 9 to the upper header 6, and a drain pipe 10 carries water of condensation away from the lower header 5. An inlet pipe 11 admits water or other cooling medium to the lower portion of the chamber inclosed by the casing 8 around the tubes 7, and a discharge pipe 12 carries the same away from the upper portion of the chamber so as to maintain a circulation through the apparatus. The tubes 7 have a coating of rubber or rubber compound 13 thereon. In Figs. 1, 2, and 3 this coating is shown as upon the exterior of the pipe only, while in Fig. 4 a coating 14 is shown upon the inside of the pipe also. It will be understood that, depending upon this class of apparatus and the class of fluids to be used, the protective coating may be employed both inside and outside, or upon the inside or the outside only. As before stated, the coating is preferably very thin,—conveniently not more than one-sixty-fourth of an inch thick,—the fact that it is applied directly to the pipe while in solution and then vulcanized in place permitting such a thin coating to be used because the coating itself so formed, need have no strength *per se*.

What I claim is:

1. A condenser or other thermal interchanger tube composed of a metal base and a protective coating, comprising a thin film of rubber in adherence therewith.

2. A condenser or other thermal interchanger tube composed of a metal base and interior and exterior protective coatings comprising thin films of rubber in adherence with the said metallic base.

3. A condenser or other thermal interchanger comprising a plurality of tubes each comprising a metal base and a coating whereby liquid may be circulated around the said tubes.

4. The herein described method of protecting metallic tubes for condensers and similar thermal interchangers consisting of applying rubber solution to the tubes and then vulcanizing the rubber solution so applied, upon the tubes.

5. A condenser or other thermal interchanger tube composed of a metal base and a protective coating within and without the same comprising a thin film of rubber upon the interior thereof in adherence with the metal base, and a thin film of rubber upon the exterior thereof also in adherence with the metal base.

JAMES ELY.

Witnesses: